(No Model.)
G. E. HUNTER.
MANUFACTURE OF TIMEPIECE BALANCES.
No. 490,204. Patented Jan. 17, 1893.
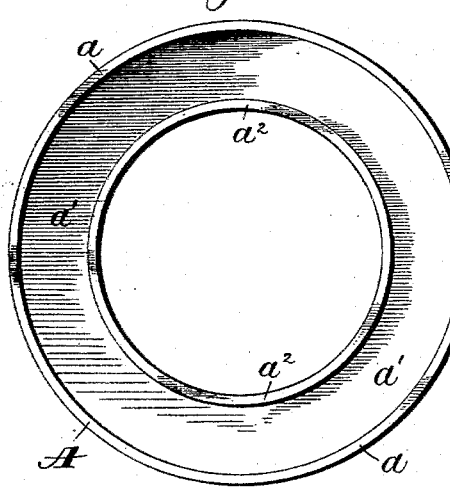
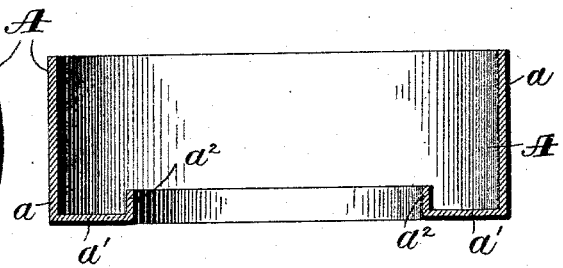
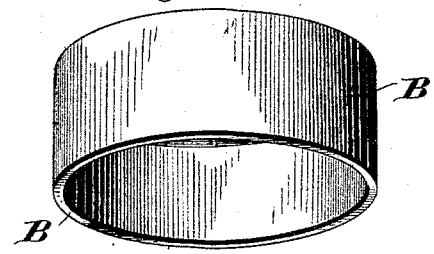
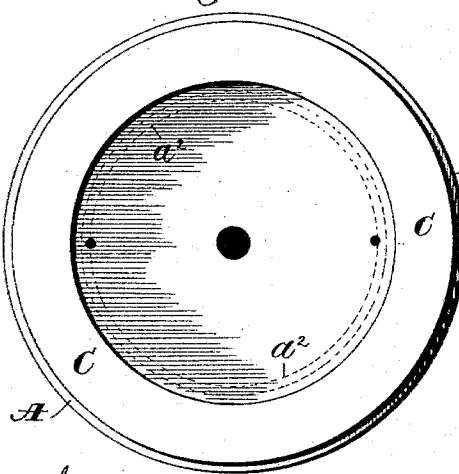
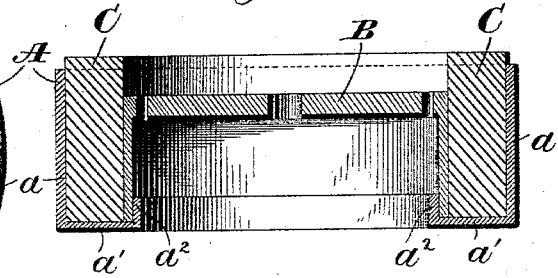
Witnesses:
Jas. E. Hutchinson
Henry C. Hazard
Inventor:
George E. Hunter, by
Crindle and Russell his attys

UNITED STATES PATENT OFFICE.

GEORGE E. HUNTER, OF ELGIN, ASSIGNOR TO THE ELGIN NATIONAL WATCH COMPANY, OF CHICAGO, ILLINOIS.

MANUFACTURE OF TIMEPIECE-BALANCES.

SPECIFICATION forming part of Letters Patent No. 490,204, dated January 17, 1893.

Application filed September 6, 1892. Serial No. 445,198. (No model.)

*To all whom it may concern:*

Be it known that I, GEORGE E. HUNTER, of Elgin, in the county of Kane, and in the State of Illinois, have invented certain new and useful Improvements in the Manufacture of Timepiece-Balances; and I do hereby declare that the following is a full, clear, and exact description thereof, reference being had to the accompanying drawings, in which—

Figure 1 is a plan view of the capsule used in my process; Fig. 2 a section taken diametrically through the same; Fig. 3 a perspective view of the steel cup employed; Fig. 4 a plan view of the cup, the brass ring and the capsule assembled, ready for the brazing operation; and Fig. 5 a section taken diametrically through said parts, thus arranged.

Letters of like name and kind refer to like parts in the several figures.

In my pending application, Serial No. 402,513, filed August 13, 1891, I describe a method of making bi-metallic balances which consists in making a cup shaped blank of steel, placing it and an encircling ring of brass in a brass capsule, and, then brazing said parts together. The rim of the steel cup furnishes the material to form the steel, annular member of the completed balance while its bottom provides the material to form the arm of the balance when finished, and the brass ring furnishes the material for the brass member of such balance. The brass capsule serves its usual function as a means to determine whether the steel has been subjected to an injurious degree of heat in the brazing operation. In practicing said method, it has been found, that in the brazing operation the edge of the rim of the steel cup is sprung inward so as to permanently lessen its diameter, and that the melted brass operates to float and displace the steel cup. These defects it is the object of the present invention to obviate, and to this end, said invention consists in the method and in the capsule, employed in making a bi-metallic balance, substantially as and for the purpose hereinafter specified.

In carrying my invention into practice I construct a capsule A, of brass, with an annular rim $a$, a bottom $a'$ with a circular opening at its center, and an upwardly extending annular flange $a^2$ at the inner edge of the bottom. The space between the rim $a$ and the flange $a^2$ is such only as to enable the rim of the steel cup B, and the brass ring C when around the latter to be placed therein, while the height of the flange $a^2$ is but one fourth that of the cup rim, and the rim of the capsule is higher than that of the cup. The steel cup B and the brass ring C are similar in every respect to the like parts in the application referred to, and their purposes have hereinbefore been mentioned. When they are to be brazed together, they are placed in the capsule with the cup in an inverted position so that its rim rests on the bottom of the capsule and encircles it, and is in engagement on its inner face with the upwardly extending flange $a^2$ of said capsule. Upon the melting of the brass ring in the brazing operation said flange by its engagement with the cup rim, supports the same and wholly prevents its inward compression, or the bodily displacement of the cup by its flotation by the melted brass. After the brazing operation, the blank thus obtained is subjected to the proper treatment to transform it into a complete or finished balance, but such treatment need not be set forth herein.

Having thus described my invention what I claim is—

1. The method employed in making bi-metallic balances which consists in placing a steel, cup-shaped blank and a brass ring encircling the same in a capsule, and with the rim of said blank supported internally, brazing said parts together, substantially as and for the purpose specified.

2. The method employed in making bi-metallic balances which consists in placing a steel, cup-shaped blank and a brass ring encircling the same in a capsule having a part to engage the blank rim on its inside, and then brazing said parts together, substantially as and for the purpose shown.

3. A capsule for use in the brazing together of the parts of a bi-metallic balance comprising an annular rim and a bottom having a part on its inner edge to enter within and support the rim of a steel cup-shaped blank, substantially as and for the purpose set forth.

In testimony that I claim the foregoing I have hereunto set my hand this 25th day of August, 1892.

GEORGE E. HUNTER.

Witnesses:
GEO. S. PRINDLE,
JAMES BRADY.